(No Model.)
F. McC. STARBUCK & R. M. TAYLOR.
DINNER PAIL.
No. 277,371. Patented May 8, 1883.
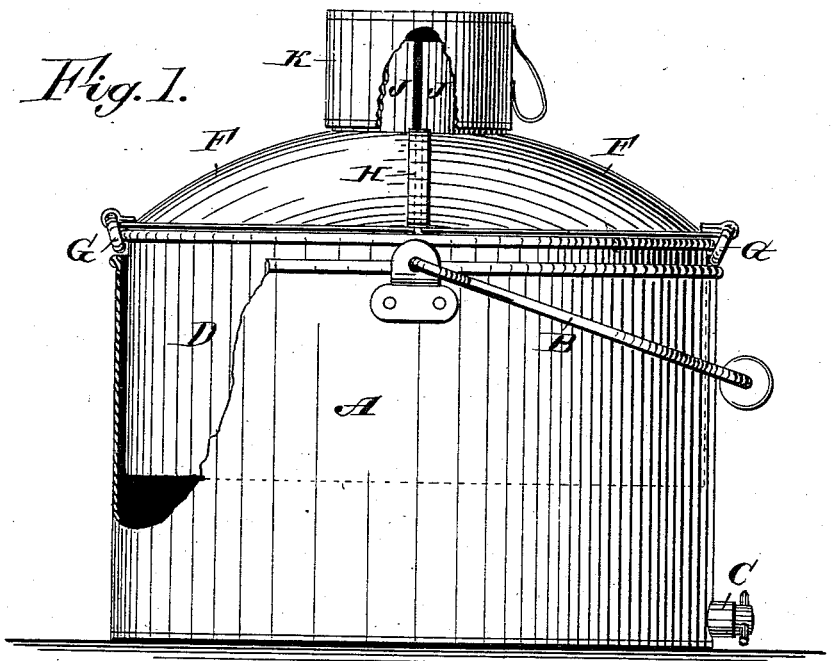
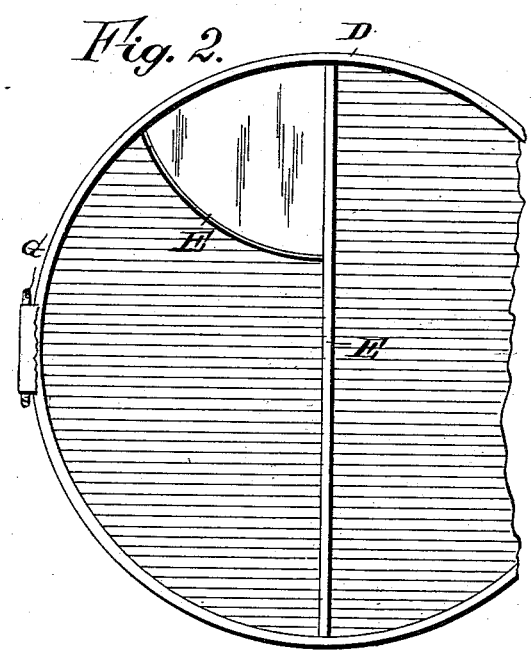
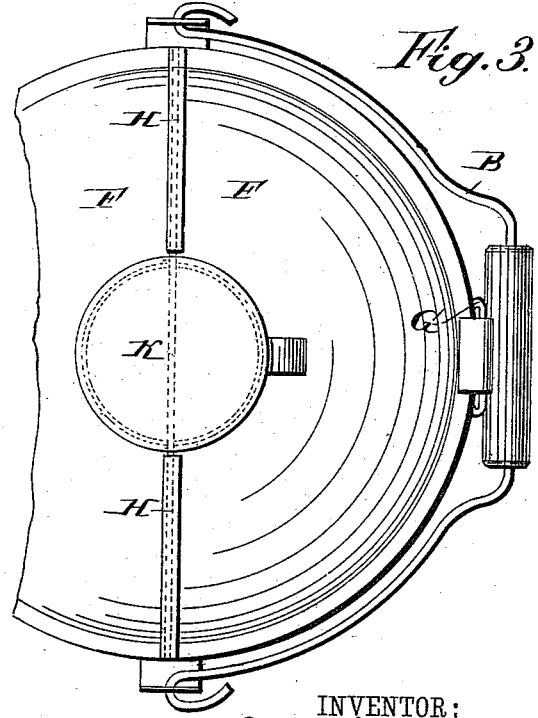
WITNESSES:
INVENTOR:
F. McC. Starbuck
R. M. Taylor
BY
ATTORNEYS.

UNITED STATES PATENT OFFICE.

FIELDING McC. STARBUCK AND RUFUS M. TAYLOR, OF ANSTED, W. VA.

DINNER-PAIL.

SPECIFICATION forming part of Letters Patent No. 277,371, dated May 8, 1883.

Application filed March 22, 1883. (No model.)

*To all whom it may concern:*

Be it known that we, FIELDING MCCLURG STARBUCK and RUFUS M. TAYLOR, of Ansted, in the county of Fayette and State of West Virginia, have invented a new and Improved Dinner-Pail, of which the following is a full, clear, and exact description.

The object of our invention is to provide a new and improved dinner-pail in which the food and liquids can be easily packed and carried, and from which they can be taken easily without requiring the pail to be taken apart.

The invention consists in a pail provided with a removable dish and with two semicircular covers hinged at diametrically-opposite points, which covers are provided at the inner edges with semi-cylindrical projections for receiving and holding a cup when the covers are closed.

Reference is to be had to the accompanying drawings, forming part of this specification, in which similar letters of reference indicate corresponding parts in all the figures.

Figure 1 is a side elevation of our improved dinner-pail, parts being broken out. Fig. 2 is a plan view of the removable inner dish or pan, parts being broken out. Fig. 3 is a plan view of the pail, parts being broken out.

The pail A is provided with a bail, B, in the usual manner, and with a cock or faucet, C, at its bottom for drawing off liquids—such as coffee, lemonade, beer, &c.—to be contained in the lower part of the pail.

A circular dish or pan, D, fits in the pail A, and is provided with a rim to rest on the rim of the pail, so that the bottom of the dish D will be about one-third the height of the pail A from the bottom of the said pail. The dish or pan D is divided into a series of compartments for the different food, &c., by the partitions E, as shown in Fig. 2. The dish D is provided with two semicircular flat or preferably convex covers, F, hinged to the edge of the dish or pan D at diametrically-opposite points, so that they can swing outward and upward, the handles G for removing the dish being fastened to the same at the said hinges.

One cover-section F is provided at the inner edge with a strip, H, to overlap the edge of the other section and cover the joint. The covers F are each provided at the middle of the inner edge with a semi-cylindrical projection, J, to receive a cup, K, when the covers are closed.

When the covers F are swung outward they can be rested on the legs of a person sitting, and serve as a table for the food. As the food is all contained in the compartments in the dish D, the pail need not be taken apart and the food need not be placed aside while removing other parts of the pail, and thus the food cannot become dusty or dirty, &c.

In our improved pail a considerable quantity of food and liquids can be packed very conveniently. The cup K holds the covers F closed and prevents them from being opened accidentally by a rough or careless handling of the pail.

Having thus fully described our invention, we claim as new and desire to secure by Letters Patent—

1. A dinner-pail constructed with two semicircular covers hinged at diametrically-opposite points to the edge of the pail, substantially as herein shown and described, and for the purpose set forth.

2. A dinner-pail provided with a removable dish, and having two semicircular covers hinged at diametrically-opposite points, substantially as herein shown and described, and for the purpose set forth.

3. A dinner-pail constructed with a removable dish divided into compartments, and provided with two semicircular covers hinged to the dish at diametrically-opposite points, substantially as herein shown and described, and for the purpose set forth.

4. A dinner-pail constructed with two semicircular covers, each provided at the inner edge with a semicircular projection for receiving and holding a cup, substantially as shown and described.

5. The combination, with the pail A, of the removable dish D, the hinged semicircular covers F, the semi-cylindrical projections J, and the strips H, substantially as herein shown and described, and for the purpose set forth.

F. M. STARBUCK.
R. M. TAYLOR.

Witnesses:
J. A. TAYLOR,
J. M. HOOD.